A. GIRTANNER.
CHAIN GRATE.
APPLICATION FILED MAR. 23, 1914.
1,202,180.  Patented Oct. 24, 1916.
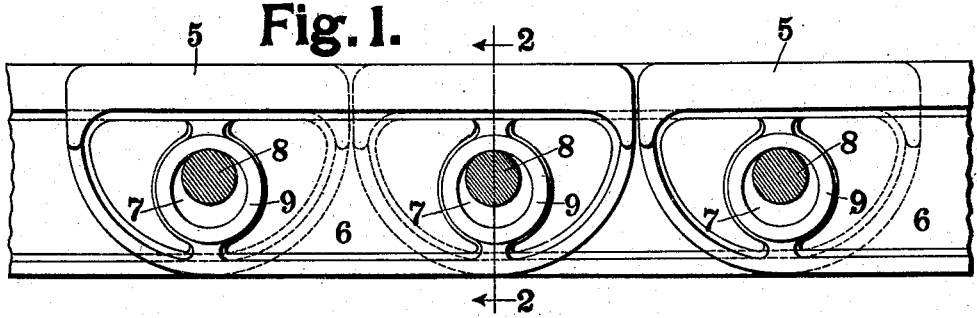
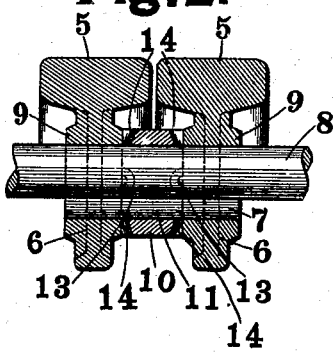
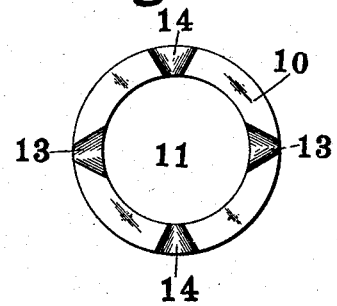
WITNESSES:
Chas. A. Becker
W. H. Alexander
INVENTOR
A. Girtanner,
BY
E. E. Huffman
ATTORNEY

UNITED STATES PATENT OFFICE.

ALEXANDER GIRTANNER, OF ST. LOUIS, MISSOURI.

CHAIN GRATE.

1,202,180.  Specification of Letters Patent.  Patented Oct. 24, 1916.

Application filed March 23, 1914. Serial No. 826,529.

*To all whom it may concern:*

Be it known that I, ALEXANDER GIRTANNER, a citizen of the United States of America, residing at the city of St. Louis, State of Missouri, have invented a certain new and useful Chain Grate, of which the following is such a full, clear, and exact description as will enable any one skilled in the art to which it appertains to make and use the same, reference being had to the accompanying drawings, forming part of this specification.

My invention relates to a chain grate, and, particularly, to means for ventilating the cross rods which hold the links of the chain together, thus preventing the overheating of such rods and their consequent bending, as is liable to occur in the present form of chain grate.

In the accompanying drawings, Figure 1 is a side view of a portion of a chain grate made in accordance with my invention, the cross rods being shown in section; Fig. 2 is a section taken on the line 2—2 of Fig. 1; and Fig. 3 is an enlarged detail view of one of the spacing collars.

Like marks of reference refer to similar parts in the several views of the drawings.

5 represents the links of a chain grate, each of these links being provided with a web 6 in which are formed a pair of apertures 7 for the passage of the cross rods 8 which hold the links of the chain together. In the form of chain shown in Figs. 1 and 2 of the drawings, each of these apertures 7 is surrounded by a shallow boss 9. In order to space the links a proper distance apart in this form of chain, each pair of the links has placed between them a spacing collar 10 provided with an aperture 11 substantially the same size as the apertures 7 in the links. It will be noted that the apertures 7 and 11 are considerably larger than the spacing rods 8 so that an air space is left between the rod and the links and collars.

In order to allow the passage of air to and from the air spaces surrounding the rods 8, recesses are formed in the spacing collar. A portion of these recesses, marked 13, are beveled inwardly while another portion, marked 14, are beveled outwardly. This form of recesses not only allows the free passage of air to and from the ventilating space but, at the same time, allows any foreign material which might enter to readily escape.

It will be evident that by providing ventilating spaces around the cross rods and providing for the passage of air to and from said ventilating spaces, the rods will be effectively cooled so as to prevent their overheating and bending.

Having fully described my invention, what I claim as new and desire to secure by Letters-Patent of the United States is:

In a chain grate, the combination with links provided with apertures to receive cross rods, of spacing collars arranged between said links and also provided with apertures, cross rods of less diameters than the apertures in said links and collars, whereby air spaces are provided around said rods, and recesses formed in the ends of said collars to provide ventilating passages for the air spaces, a portion of said recesses being beveled inwardly, and a portion being beveled outwardly.

In testimony whereof, I have hereunto set my hand and affixed my seal in the presence of the two subscribing witnesses.

ALEXANDER GIRTANNER. [L. S.]

Witnesses:
W. A. ALEXANDER,
G. M. SHORE.

Copies of this patent may be obtained for five cents each, by addressing the "Commissioner of Patents, Washington, D. C."